United States Patent [19]

Hitt et al.

[11] Patent Number: 4,507,962
[45] Date of Patent: Apr. 2, 1985

[54] DIGITAL BAROMETRIC ALTIMETER

[75] Inventors: Gerard J. Hitt, Glendale Heights; Victor A. Nowakowski, Lake Zurich; Walter R. Warren, Elmhurst, all of Ill.

[73] Assignee: AAR Corp., Elk Grove Village, Ill.

[21] Appl. No.: 300,230

[22] Filed: Sep. 8, 1981

[51] Int. Cl.³ .............................................. G01L 7/00
[52] U.S. Cl. ........................................ 73/384; 364/433
[58] Field of Search ................ 73/384, 385, 386, 387, 73/708, 714, 756, 717, 718–728, 753, 754, 733, 735, 734, 745, 746; 340/611; 364/433, 558, 562

[56] References Cited

U.S. PATENT DOCUMENTS

| | | | |
|---|---|---|---|
| 2,918,821 | 2/1959 | Phillips | 73/384 |
| 2,921,471 | 1/1960 | Weber et al. | 73/384 X |
| 3,064,478 | 11/1962 | Schafer | 73/384 |
| 3,625,061 | 12/1971 | Schwarz | 73/384 |
| 3,726,138 | 4/1973 | Kosakowski et al. | 73/179 |
| 3,839,626 | 10/1974 | Klem et al. | 235/151.3 |
| 3,842,676 | 10/1974 | Brown et al. | 73/384 |
| 3,958,108 | 5/1976 | Shimomura | 235/150.25 |
| 3,958,459 | 5/1976 | Shimomura | 73/384 |
| 4,005,282 | 1/1977 | Jennings | 364/558 X |
| 4,086,580 | 4/1978 | Schroeder | 340/347 P |
| 4,086,810 | 5/1978 | Ball | 73/179 |
| 4,106,343 | 8/1978 | Cook | 73/387 |
| 4,128,188 | 1/1980 | Britton et al. | 73/708 X |
| 4,135,403 | 1/1979 | Skarvada | 73/384 |
| 4,292,671 | 9/1981 | Evans et al. | 364/433 |
| 4,302,973 | 12/1981 | Yoshino et al. | 73/384 |

Primary Examiner—Anthony V. Ciarlante
Assistant Examiner—Tom Noland
Attorney, Agent, or Firm—Hill, Van Santen, Steadman & Simpson

[57] ABSTRACT

A digital barometric altimeter has an electrical pressure transducer juxtaposed with a pitostatic port, and has a processor located remotely from the port, interconnected with the transducer by an analog-to-digital converter. The processor filters the pressure-responsive data, linearizes it, and converts it to altitude-representative data, using a "jump-and-converge" procedure. The altitude-representative output may be supplied to a display or other utilization device.

14 Claims, 6 Drawing Figures

DIGITAL BAROMETRIC ALTIMETER

BACKGROUND OF THE INVENTION

1. Field of the Invention

The present invention relates to a barometric altimeter, and more particularly to a barometric altimeter employing a solid state pressure transducer, located in physical proximity to a pitostatic tube, with means for developing an accurate digital representation of the altitude as the function of a signal derived from the pressure transducer.

2. The Prior Art

Present day aircraft typically use aneroid barometers, which employ pressure responsive devices such as a Bourdon tube or the like, to transduce pressure into mechanical movement so that the altitude is indicated, as a function of pressure, by movement of a needle or the like on a panel meter. The pressure transducer is located at the site of the meter, and relatively long lengths of tubing extend from a pitostatic tube to the site of the instrument, in order supply the pressure to the transducer.

Such barometers lack accuracy, and involve a considerable amount of tubing, especially in the case of large airplanes having multiple pitostatic tubes. An airplane such as the Boeing 747 employs a considerable number of pitostatic tubes or ports, and at the present time long lengths of tubing are required to extend from each of the pitostatic ports to a pressure transducer located remotely therefrom.

In addition to the expense involved in the construction of present day systems, there is also considerable effort required to insure that the tubing does not leak when it passes through an area (such as the interior of the aircraft) having a pressure which differs from the pressure within the tube. Leakage in such an area of course would lead to an inaccurate result. Other maintenance is also necessary, which increases the cost of maintaining the system.

In addition, the accuracy of such systems is limited, and therefore must be supplemented by more accurate altitude measuring apparatus when precision in altitude measurement is critical.

Several attempts have been made to design altimeters employing solid state transducers, in place of the pressure-mechanical transducers, but since the electrical transducers are located remotely from the pitostatic port, they still require a length of conduit interconnecting the transducer with the port. Thus the problem involving the tubing or conduit has not been overcome.

In addition, attempts to use digital techniques for altimeters have not met with success because a relatively high storage capacity is required for a processor to develop an accurate digital representation of altitude from a pressure responsive signal. This has tended to make such apparatus complicated and expensive, so that they have not been able to displace the traditional aneroid barometers incorporating large quantities of tubing and pressure-mechanical transducers.

SUMMARY OF THE INVENTION

It is a principal object of the present invention to provide a digital altimeter which is simple and effective, and which does not require long lengths of tubing or conduit.

Another object of the present invention is to provide a digital altimeter which is accurate and inexpensive, and which eliminates the disadvantages of the conventional barometric altimeters.

A further object of the present invention is to provide a digital altimeter in which the transducer is located in proximity to the pitostatic tube or port, with means for carrying an electrical signal developed by said transducer to a location remote from said port for digital display of the altitude corresponding to the pressure at the port.

A further object of the present invention is to provide a digital barometric altimeter in which a minimum digital storage capacity is required, without sacrificing accuracy.

Another object of the present invention is to provide a digital barometric altimeter in which the accuracy is independent of temperature at the location of the pitostatic port or of the pressure-electric transducer.

A further object of the present invention is to provide a method of accurately determining altitude as a function of barometric pressure, incorporating the steps of first determining the approximate altitude as a function of the pressure-responsive signal, and then separately determining the altitude with precision using as independent variables the approximate altitude, and the pressure-responsive signal.

Another object of the present invention is to provide a method for determining altitude, using a stochastic filter.

The use of the present invention enables most altimeter tubing to be eliminated, and provides an accurate digital indication of the altitude, compensated for temperature. In a further embodiment of the present invention, the digital altitude-representative signal may be used in a variety of other instruments which require an altitude-responsive input.

These and other objects and advantages of the present invention will become manifest by an examination of the following description of the accompanying drawings.

BRIEF DESCRIPTION OF THE DRAWINGS

Reference will now be made to the accompanying drawings, in which.

DESCRIPTION OF THE PREFERRED EMBODIMENT

Figure 1:
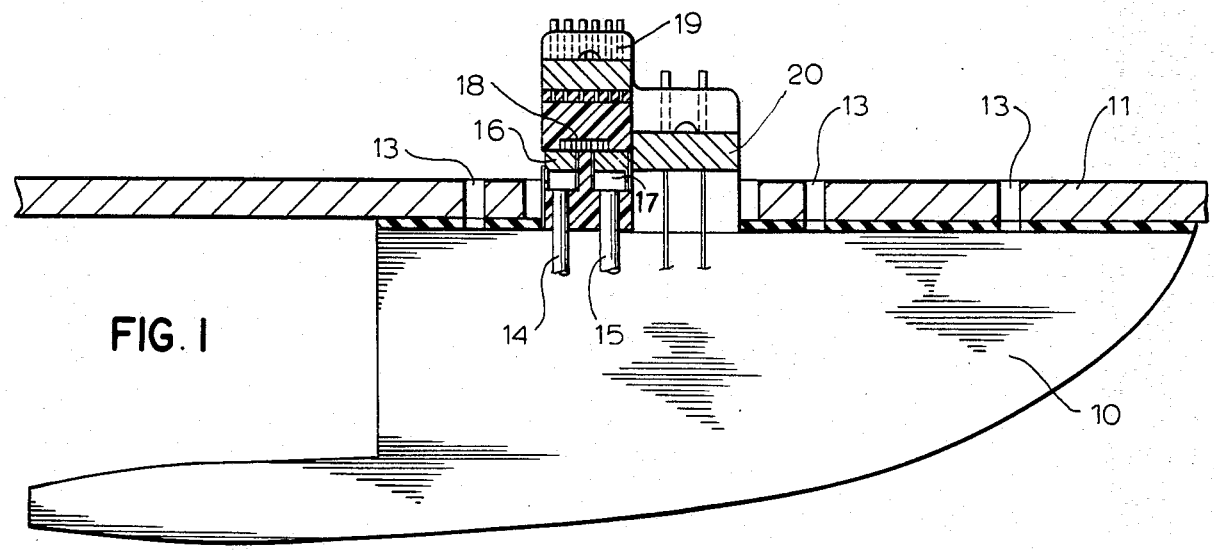
FIG. 1 is a diagramatic illustration of one embodiment of the present invention, showing the physical arrangement of the transducer in association with a pitostatic tube.

Referring now to FIG. 1, a pitostatic port housing 10 is illustrated in cross-section, supported on an exterior airframe wall 11 and attached thereto through holes 13 for accepting bolts (not shown). The housing 10 contains two tubes 14 and 15, one end of each being shown in FIG. 1. The tube 14 is a pitot tube and the tube 15 is a static tube. The opposite end of each tube is arranged in the conventional manner, so that the pressure in each tube responds to the desired condition. A pressure transducer 16 is juxtaposed with the open end of the tube 14, and a similar pressure transducer 17 is juxtaposed with the open end of the tube 15, so that each transducer responds to the pressure within its respective tube. A temperature sensor 18 is juxtaposed with both pressure transducers, and produces a signal responsive to the temperature of the transducers. An electrical connector 19 is provided, and the ports 14–19 are all supported together by being cast into a solid epoxy module secured to the housing 10. Electrical connection to the components is releasably made via the connector 19.

Optimally, when the housing 10 also contains a heater, the electrical connections to the heater are made via a connector 20 which is cast in place with the other components.

It can be seen that this construction entirely eliminates any tubing leading from the site of the port to remote locations, and only electrical conductors are required to connect the apparatus to another location.

Figure 2:
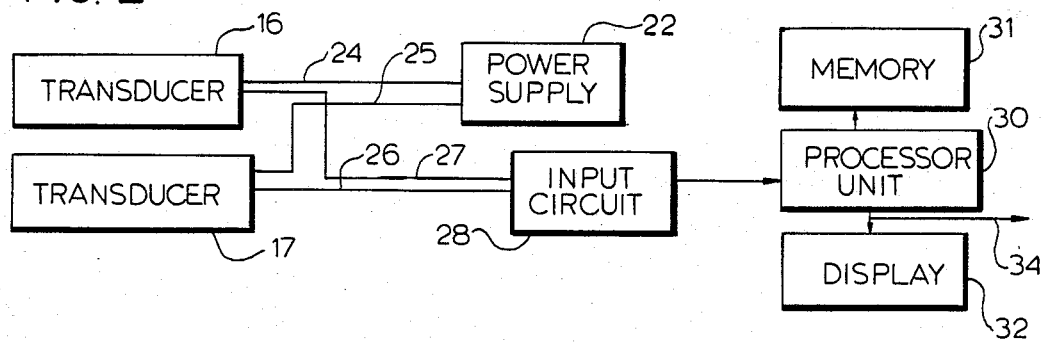
FIG. 2 is a functional block diagram of the major components of the electrical system, which cooperates with the apparatus of FIG. 1.

The components of FIG. 2 are located at a position remoted from the pitostatic port. A power supply 22 supplies power required by the transducers 16 and 17, and is connected thereto by wires 24 and 25.

Another pair of wires 26 and 27 lead from the transducers 16 and 17 individually to an input circuit 28 which is also located remotely from the pitostatic port 10. The input circuit 28 is connected to a processor unit 30, having a memory 31, and the output of the processor 30 is delivered to a display device 32 for displaying the altitude, and to a line 34 which may be interconnected with other instruments requiring an altitude-responsive signal as an input. The memeory 31 is preferably composed of a read only memory or ROM and a random access memory or RAM. The ROM stores the program consisting of instruction words and set constants, while the RAM contains working registers and counters, and stores data results of calculations, and other changable parameters. They are interconnected with, and accessed by, the processing unit 30 in the customary way and therefore need not be described in detail.

Figure 3:
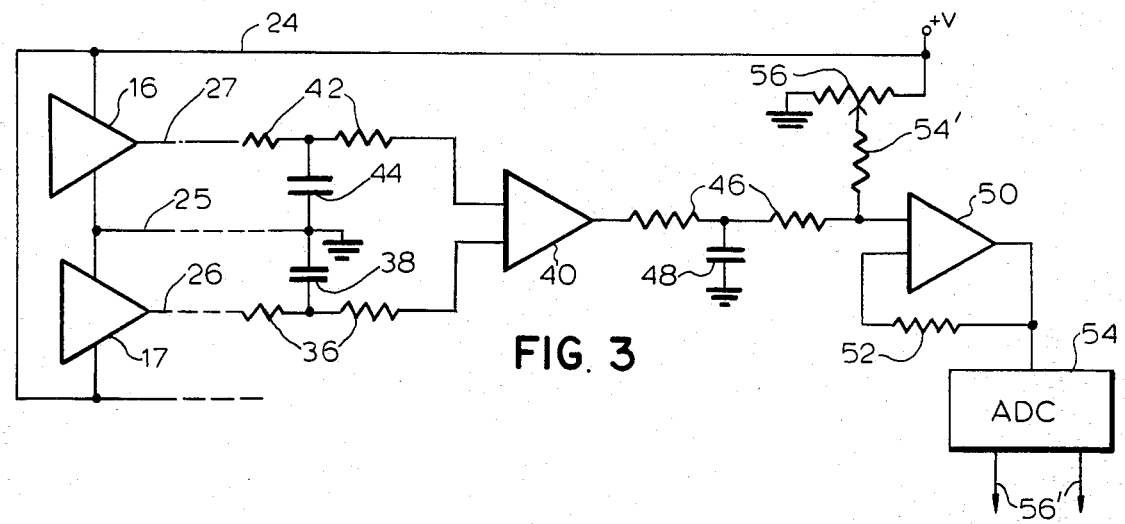
FIG. 3 is a schematic circuit diagram of the input circuit of the apparatus of FIG. 1.

A schematic diagram of the input circuit is illustrated in FIG. 3. The transducers 16 and 17 are shown in diagramatic form, with connections to the lines 24–27. Line 26 is connected through a low-pass filter incorporating resistors 36 and a capacitor 38 to the input of an operational amplifier 40, and the line 27 is connected through a low-pass filter incorporating resistors 42 and capacitor 44 to the other input of the amplifier 40. The output of the amplifier 40 is connected through a low-pass filter incorporating resistors 46 and capacitor 48 to the noninverting input of an operational amplifier 50, the gain of which is controlled by a feedback resistor 52. The noninverting input of the amplifier 50 is also connected to a source of bias voltage through a resistor 54'. The bias is adjustable by means of a potentiometer 56 interconnected between a source of positive voltage and ground. The potentiometer 56 is provided for a pressure reference adjustment, by which the display of the altimeter may be calibrated. Adjustment of the potentiometer 56 adds a constant term to the input voltage, without affecting the scale of the voltage. The scale of the voltage, i.e., the rate of change of voltage with pressure, is determined by the size of the fixed resistor 52. The output of the amplifier 50 is connected to the input of an analog-to-digital converter 54, which produces digital outputs on a plurality of lines 56' which are supplied to the processor unit 30 (FIG. 2).

The bridge connection of transducers 16 and 17, compensate for the temperature within the compartments 14 and 18. By balancing the output of the two transducers against each other in the bridge circuit of FIG. 2, temperature can be effectively eliminated as an independent variable. The output of the amplifier 50 and the output of the ADC 54 is therefore is accurately representative of pressure. Accordingly, the temperature transducer 18 is normally not required. For application in which extreme accuracy is required, however, the temperature transducer is used as described hereinafter.

Figure 4:
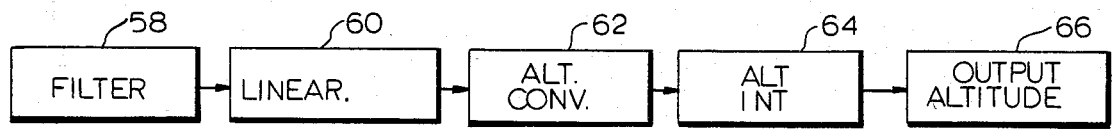
FIG. 4 is a functional block diagram of the processor unit of FIG. 1.

The functional components of the processor unit 30 are illustrated in FIG. 4. A filter unit 58 receives the output of the analog to digital convertor 54, and filters the signal by eliminating components due to vibration and other noise. The expression for the filter function is $$P_{(k+1)} = P_{(k)} + G_{(k+1)}[Z_{(k+1)} - P_{(k)}]$$

where P represents pressure, k is the sample number, G is a gain factor between 0 and 1, and Z is the input signal from the ADC. It can be seen that the pressure at any particular sample time differs from the previous sample by a difference quantity amplified by the gain factor G.

The gain term G is described in detail hereinafter.

As the variance in Z increases above the expected value R, the gain G is reduced. As the variation in Z decreases, the gain increases, as described in detail hereinafter.

The control of the G term allows the filter to have a high gain G in the absence of noise, and the gain is lowered when the instantaneous output of the ADC is widely different from its recent average level, which is the case when noise is present.

The output of the filter 58 is supplied to a linearization unit 60, the purpose of which is to linearize the response of the transducers to pressure. Next the altitude converter unit 62 estimates the altitude within plus or minus 50 feet, or 15 meters, from the signal supplied to it by the linearization unit 60. Then the altitude interpolation unit 64 interpolates within the interval established by the altitude conversion unit 62, to increments of about $3\frac{1}{2}$ feet, or about 1 meter. Finally, the precise altitude is made available to a display or other output utilization device by an output unit 66. The display is designed to operate at 0.1 second intervals; this includes the operation of the linearization unit 60, altitude converter 62, and altitude interpolation unit 64.

Figures 5, 6:
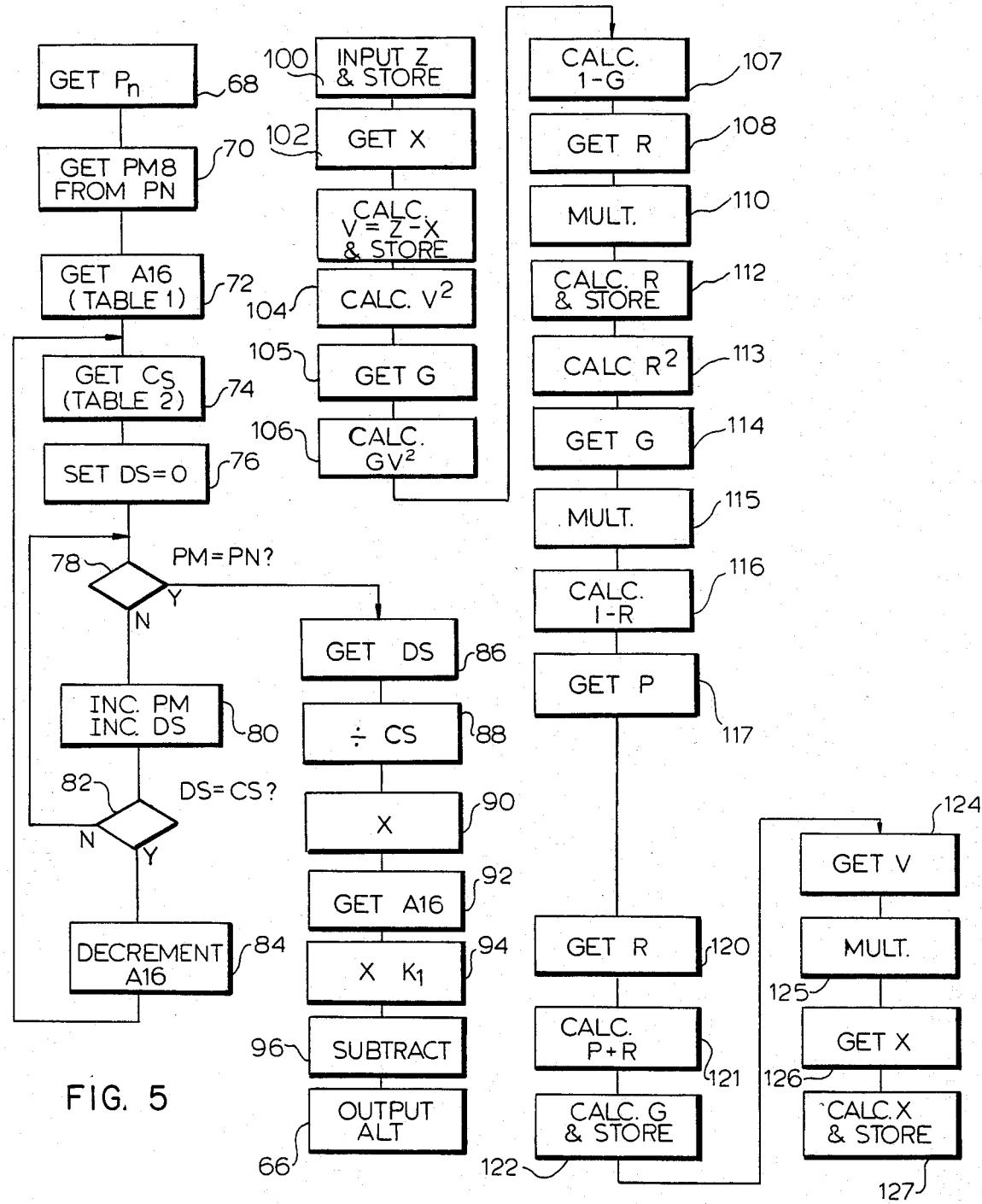
FIG. 5 is a diagram in the nature of a flow chart showing units included within the altitude conversion block of FIG. 4.
FIG. 6 is a diagram in the nature of a flow chart showing units included within the filter block of FIG. 3.

Referring to FIG. 5, the procedure for determining the altitude from the linearized data received from the unit 60 is illustrated. Unit 68 gets the linearized output of unit 60, which will be referred to as $P_n$. This is a 12 bit word, which is a linearized representation of pressure to an accuracy of about $\pm 0.1$ mm of mercury. Unit 70 derives from $P_n$ a smaller number $P_m$, 8 bits in length. $P_m$ corresponds to the highest order 8 bits of $P_n$. Unit 72 accesses table 1 stored in ROM using $P_m$ as an address, and reads out A, a 16 bit word, representing the altitude at the pressure corresponding to the highest 8 bits of $P_n$. Control is then passed to unit 74, which uses the highest 10 bits of A as an address to access table 2, to read out the quantity $C_s$. $C_s$ represents the quantity which must be added to $P_m$ to obtain the pressure corresponding to one unit less in altitude than represented by A. Control is then passed to unit 76 which sets the counter $D_s$ to zero, and then unit 78 inspects $P_n$ to determine whether it is equal to $P_m$. The first time unit 78 is reached, $P_n$ is smaller than $P_m$, and so control is passed to unit 80. Unit 80 increments $P_m$ and increments the counter $D_s$. Control is then passed to unit 82 which determines whether $D_s = C_s$. If not, control is returned to unit 78, and steps performed by units 78-82 are repeated until $D_s$ is equal to $C_s$, unless $P_n$ is first found equal to $P_n$. Assuming that $P_n$ still differs from $P_m$, unit 84 decrements the quantity A, and uses the updated value of A to refer again to table 2 and get a new value of $C_s$. Unit 76 then resets $D_s$, after control passed through unit 78 to unit 80, which again increments $P_m$ and decrements $A_s$.

The sequence described above continues until $P_m$ has been incremented to equal $P_n$, after which control is passed to unit 86. During the prevous interval, the value of $P_m$ and A have been changed in combination, with each reduction of one unit in A corresponding to an increase in $P_m$ by the quantity $C_s$. The quantity $C_s$ represents the slope of the relationship between pressure and altitude at a given altitude, so that the instantaneous values of A and $P_m$ are always in accurate relationship to each other. When $P_n$ has been reached, the quantity A stands at the correct altitude for the value for $P_m$ at the time the altitude quantity A was last decremented. To the extent that $P_m$ has been further incremented by unit 80, the number of such increments is manifested in $D_s$, and represents a further fraction of reduction in the altitude A.

Unit 86 gets the quantity stored in $D_s$ and passes control to unit 88, which divides that quantity by $C_s$, thereby arriving at the fraction by which the altitude must be further reduced. Then unit 90 multiplies that fraction by quantity K1 stored in ROM, to convert the scale of the fraction to represent feet. Then control is passed to unit 92 which gets the quantity A, after which unit 94 multiplies it by the factor K1 to provide a representation of the altitude in feet. Then unit 96 subtracts the quantity calculated in unit 90 from the quantity calculated in unit 94 to arrive at the accurate altitude in the units of feet, and unit 66 makes the output altitude available to a display device or other utilization device.

It can be seen from the above description that table 1 is referred to first, to get A, which represents the altitude to within about 200 feet (60 m). Table 1 is organized as 8 bits of address and 16 bits of data and is therefore very economical storage capacity, requiring only about 4000 bits total. Notwithstanding its small size, however, the data represents altitude very accurately, to about 1 part in 64,000. Over a range of altitudes extending from $-1000$ feet (300 m) to $+50,000$ feet (1.5 km), this accuracy is much better than can be attained by a mechanical type aneroid barometer.

Although table 1 contains altitude data only for discrete intervals about 200 feet (60 m) apart, this accuracy is extended to intermediate altitude by the use of table 2, which contains data indicating the slope of the characteristic curve between the fixed points. Table 2 is organized as $2_{10}$ 10 bits of address and 3 bits of slope data and thus contains only about 3000 bits total. Together, tables 1 and 2 extend the accuracy of the altitude data to the equivalent of a memory having a much larger capacity, yielding an accuracy to about 50 feet (15 m). The slope data is precise enough to allow four intervals of different slope between successive points in table 1, and allows interpolation which yields altitude data accurate within about 3.5 feet (about 1 m). The interpolation is rendered more precise by supplying multiple slopes for the intervals between successive points represented by data in table 1.

The method of arriving at the altitude may be referred to as a "jump-and-converge" method, for an immediate "jump" is made to an approximate altitude, using table 1, and then table 2 allows a "convergence" on a more precise altitude, after which interpolation increases the precision.

The units included in the filter 58 are illustrated in FIG. 6. Although both FIGS. 5 and 6 may be interpreted as representing a program which may be carried out, for example, on a conventional or commercially available microprocessor unit or MPU, if desired, the individual units of these figures may be implemented by dedicated hardware, including registers, comparators, and the like. The blocks in the figures therefore have a structural representation as well as a functional one.

The stochastic filter of FIG. 6 arrives at a value of x from a sensed input z derived from the pressure transducer by means of the following relations: First, the difference v is calculated by subtracting the current sample of the signal from the transducer z from the previously calculated output value x (or 0 if x has not previously been calculated):

$$v = z - x$$

Then a measurement noise variance parameter R is calculated, using the newly calculated value of v, a previously calculated value of R (zero initially) and a previously calculated value of the gain G (initially 1.0):

$$R = (1 - G)R + Gv^2$$

Following this, the gain G is updated by calculating:

$$G = P/P + R$$

The mean error variance parameter P is a constant which is set equal to about 0.003 for optimal filter characteristics under various noise conditions. Finally the filtered output value x is calculated using the updated gain and the last calculated value of x (initially zero):

$$x = x + Gv.$$

The result is to produce a series of samples to the linearization unit 60, which represent successive samples of the signal from the pressure transducer, taken at equal time intervals, but with much of the noise present in such signal filtered out.

The RAM of the memory unit 31 stores, in registers provided for that purpose, the initial and calculated values of x, R, P and G, in areas which will be designated as the x, R, P and G registers, respectively. The RAM also contains working registers which are necessary for the operation of the stochastic filter.

The first operation of the filter is performed by unit 100 (FIG. 6) which inputs z from the transducer, (or from the analog-to-digital converter associated therewith) and stores it in a working register. Then unit 102 gets the initial or previously calculated value x, and passes control to unit 103 which calculates v and stores it in a working register. Then unit 104 calculates $v^2$, unit 105 gets the initial or previous value G, and unit 106 calculates $Gv^2$. Control then passes to unit 107 which calculates $1 - G$, after which unit 108 gets the initial or previously calculated value of R and the unit 110 multiplies the difference derived from unit 107 by the quantity R. Then unit 12 calculates an updated value of R, and stores it in the R register.

Next unit 113 receives control, which calculates $R^2$, after which unit 114 gets the initial or previously calculated value of G, and unit 115 multiplies these together. Then unit 116 calculates the quantity $1-R$, after which unit 117 gets constant P, which is stored in the P register.

Next unit 120 gets the previously calculated value of R, and unit 121 calculates the quantity $P+R$, after which unit 122 calculates the new value of G and stores it in the G register.

Unit 124 then gets v, which was stored by unit 103, and unit 125 multiplies Gv. Then unit 126 gets the initial or previously calculated value of x, and unit 127 calculates the new value of x and stores it in the x register.

The filter of FIG. 6 may be referred to as a recursive adaptive stochastic filter or RAS filter. Its operation is to remove or greatly reduced signal variation due to noise, leaving a value which estimates the true mean value of the noise-free incoming signal. The filter of FIG. 6 achieves the advantage of maximizing performance (and reducing the effective noise) while maintaining complexity at a minimum. It requires relatively little memory space, and can be performed quickly, so that a relatively high sampling rate is maintained. Preferably, each time a sample is input from the transducer, the filter routine is performed, so that the filtered output quantity is available to the linearization unit 60, a very short time after each sampling time.

The filter of FIG. 6 is optimal, because it minimizes the error over a broad range of noise and signal functions, permitting the relatively high sampling rate. In addition, its phase error is minimal. The filter is a tracking filter, and allows for dynamic changes in the signal mean.

When the input signal contains a harmonic noise component, the gain term G is varied automatically in such a way that the effect of such noise is minimized.

The linearization unit 60 (FIG. 4), may be omitted from the apparatus of the present invention, if the operation of the apparatus is confined to a linear portion of the pressure-voltage curve of the transducer which is used, or if some lack of accuracy can be tolerated while operation is in the range of such nonlinear portions. When extreme accuracy over a wide range is required however, the linearization unit 60 is employed, to develop an output which is a linear relationship to pressure over the operating range. The linearization unit 60 preferably comprises a table look-up operation, using a portion of the ROM, in which the most significant bits of the digitized signal from the transducer is used to address the ROM, and the data read-out of the ROM constitutes a signed correction signal which is added to or subtracted from the quantity x produced by the filter unit 58. Alternatively, the jump and converge routine illustrated in FIG. 5 may be used to provide a more precise linearization of the signal from the filter unit 58, but this is ordinarily not required when modern pressure transducers are employed.

Although in the arrangement of FIG. 1, two pressure transducers are illustrated, connected in a bridge arrangement for cancelling temperature effects, alternatively the output from the temperature sensor 18 may be employed to perform further calculations for correcting either the output of the filter unit 58, or the output of the altitude conversion unit 62 for the effective temperature on the pressure transducer. In this event only a single pressure transducer is required, and the static tube 15 and its associated pressure transducer 17 may be omitted from the apparatus of FIG. 1.

It will be understoodd that in each of the several embodiments described above, the calculations are preferably performed digitally, and to that end an analog-to-digital converter, not shown separately but forming a part of the processor unit 30, is employed to digitize the analog signals from the pressure transducer (and the temperature transducer if required) at a predetermined sampling time. Update periods of 10 altitude computations per second are rapid enough to permit the display of current altitude data on a display unit as fast as it can be read by a human operator.

In another aspect of the present invention, the altitude-representative signal, output by the unit 66, may be used by a variety of other units (not shown) whenever altitude (or the pressure associated with altitude) is important to their operation. When so used, the customery tubing normally used to transmit pressure signals in the form of an air pressure are not required, with a result that the cost, complexity, and maintenance requirements are simplified.

Other modifications and additions may be made in the apparatus of the present invention without departing from the essential features of novelty thereof, which are intended to be defined and secured by the appended claims.

What is claimed is:

1. A digital altimeter comprising a pressure transducer for developing an electrical signal in response to air pressure, said transducer being supported on an exterior air frame wall and connected to a pitot tube mounted in a housing supported on the exterior side of said air frame wall, filter means connected to said transducer for filtering noise from the electrical signal developed by said transducer, said filter means comprising a recursive adaptive stochastic filter, an analog-to-digital converter for converting said signal to digital form, and a processor unit connected to said analog-to-digital converter for developing a digital signal representative of the altitude corresponding to the pressure sensed by said transducer, said transducer being located in direct proximity to a pitostatic port.

2. Apparatus according to claim 1, including a housing surrounding said pressure transducer at the location of said port, said housing having an electrical connector connected to said transducer, and means connecting said electrical connector to said analog-to-digital converter and said processing unit.

3. Apparatus according to claim 2, including a temperature sensor located in physical proximity to said pressure transducer, said temperature sensor comprising an electrical transducer interconnected to said processor through said connector.

4. Apparatus according to claim 1, including a second transducer juxtaposed with said first transducer, said second transducer being connected to said analog-to-digital converter and said processor unit by way of said connector, and means connecting said first and second transducers in a bridge circuit, whereby the effect of temperature on the signal produced by said transducer is minimized.

5. Apparatus according to claim 4, wherein said second transducer is juxtaposed with a static port.

6. Apparatus according to claim 1, including a utilization device, and electrical conductor means for connecting said processor unit to said utilization device, whereby said utilization device is adapted to receive a digital electrical signal representative of altitude.

7. A method of generating a digital representation of the altitude of an aircraft from a pressure-representative electrical signal produced by a pressure transducer mounted on an exterior airframe wall of said aircraft, comprising the steps of:
  (a) converting said electrical signal to digital form,
  (b) filtering noise from said digital signal by sensing the amount of noise in said digital signal and generating another digital signal representative of a signal from said pressure transducer which has a reduced noise component,
  (c) determining the approximate altitude corresponding to the pressure represented by said other digital signal,
  (d) determining a slope representative quantity representing the slope of the relationship between pressure and altitude at a given altitude by processing a signal representing said approximate altitude, and
  (e) calculating a corrected altitude representative digital signal using said signal representing said approximate altitude, said slope representative quantity, and said other digital signal.

8. The method of claim 7, including the steps of providing a first table correlating specific altitudes with values of said other signal, and providing a second table with a plurality of slopes individually associated with said specific altitudes, said slope representative quantity obtained from said second table.

9. The method of claim 8, wherein the step of calculating said corrected altitude comprises the steps of successively arithmetically combining said slope-representative quantity with said approximate altitude while successively arithmetically combining, with opposite sign, predetermined intervals with at least a part of said other signal.

10. The method of claim 9, including the step of repeating said combining steps unit said other signal is equal to one of said combined signals.

11. The method of claim 10, including the step of further correcting the corrected altitude by combining said corrected altitude-representative digital signal with an interpolated quantity derived from said slope representative quantity, and one of said combined signals.

12. The method according to claim 7, including the step of providing said corrected altitude-representative signal to a utilization device via electrical conductors.

13. The method according to claim 7, wherein said filtering step comprises the steps of calculating a gain term in response to the amount of noise detected in said pressure-representative digital signal, and updating a pressure representative quantity by arithmeticaly combining it with the product of said gain term and the difference between a previous value of said pressure representative quantity and the current value of said pressure-representative signal.

14. The method according to claim 13, including the steps of calculating a first parameter R from said difference, a previously calculated value of said gain, and a previously calculated value of said first parameter,
  calculating a second parameter P from previously calculated values of said gain R, and P,
  calculating an updated value of said gain from said parameters P and R, and
  using said gain to calculate said output quantity.

* * * * *